(12) United States Patent
Pawlucki et al.

(10) Patent No.: US 11,358,157 B2
(45) Date of Patent: Jun. 14, 2022

(54) PRESSURE REGULATOR FOR INFLATION SYSTEMS

(71) Applicant: Goodrich Corporation, Charlotte, NC (US)

(72) Inventors: Mateusz Pawlucki, Wroclaw (PL); Mateusz Molfa, Zdzieszowice (PL)

(73) Assignee: GOODRICH CORPORATION, Charlotte, NC (US)

( * ) Notice: Subject to any disclaimer, the term of this patent is extended or adjusted under 35 U.S.C. 154(b) by 83 days.

(21) Appl. No.: 16/718,243

(22) Filed: Dec. 18, 2019

(65) Prior Publication Data
US 2020/0409397 A1  Dec. 31, 2020

(30) Foreign Application Priority Data
Jun. 28, 2019 (EP) .................................. 19461551

(51) Int. Cl.
*B64D 25/14* (2006.01)
*F04F 5/16* (2006.01)
(Continued)

(52) U.S. Cl.
CPC .............. *B05B 1/005* (2013.01); *B64D 25/14* (2013.01); *F04F 5/16* (2013.01); *F04F 5/465* (2013.01);
(Continued)

(58) Field of Classification Search
CPC ................ B63C 9/18; B63C 2009/042; Y10T 137/2599; F04F 5/16; F04F 5/18;
(Continued)

(56) References Cited

U.S. PATENT DOCUMENTS 3,431,742 A * 3/1969 Green .................... B64D 25/14
62/48.4
3,640,645 A * 2/1972 Forsythe ................. F04F 5/466
417/174

(Continued)

FOREIGN PATENT DOCUMENTS

CN 2700804 Y 5/2005
DE 143290 A1 5/1983
(Continued)

OTHER PUBLICATIONS

European Search Report for Application No. 19461551.4, dated Jan. 14, 2020, 12 pages.

*Primary Examiner* — William M McCalister
(74) *Attorney, Agent, or Firm* — Cantor Colburn LLP

(57) ABSTRACT

A pressure regulator comprises a primary fluid inlet for connection to a source of high pressure fluid, a fluid outlet for connection to a space to receive the high pressure fluid, a convergent-divergent nozzle having an upstream convergent section, a throat and a downstream divergent section, the primary fluid inlet being in fluid communication with the convergent section of the nozzle; and an outlet pipe having an upstream end arranged around but radially spaced from the outlet of the divergent section of the nozzle, the outlet pipe arranged to receive fluid flow from the outlet of the divergent section of the nozzle and conduct the fluid flowing from the nozzle to the fluid outlet.

14 Claims, 4 Drawing Sheets

(51) Int. Cl.
*F04F 5/46* (2006.01)
*B05B 1/00* (2006.01)
*F15D 1/02* (2006.01)
*B05B 12/08* (2006.01)
*G05D 16/20* (2006.01)

(52) U.S. Cl.
CPC .............. *B05B 12/085* (2013.01); *F15D 1/02* (2013.01); *G05D 16/2066* (2013.01); *G05D 16/2095* (2019.01)

(58) Field of Classification Search
CPC ..... F04F 5/20; F04F 5/22; F04F 5/465; B64D 25/14; F15D 1/02; B05B 1/005; B05B 12/085
USPC ...................................................... 137/115.11
See application file for complete search history.

(56) References Cited

U.S. PATENT DOCUMENTS

| | | | | |
|---|---|---|---|---|
| 3,973,645 A * | 8/1976 | Dix | ........................ | B64D 25/14 182/48 |
| 4,807,814 A * | 2/1989 | Douche | ..................... | F04F 5/22 239/428 |
| 4,880,357 A * | 11/1989 | Mathers | ..................... | F04F 5/20 417/7 |
| 5,647,221 A * | 7/1997 | Garris, Jr. | ................. | F04F 5/18 417/179 |
| 5,988,438 A * | 11/1999 | Lewis | ........................ | B63C 9/18 222/3 |
| 6,591,873 B1 * | 7/2003 | McNeil | .................... | F01D 5/022 141/4 |
| 6,641,445 B1 * | 11/2003 | Jurlina | .................... | B64D 25/14 441/41 |
| 2008/0230632 A1 * | 9/2008 | Fenton | .................. | F23D 11/102 239/433 |
| 2018/0050677 A1 * | 2/2018 | Valentine | .............. | B60T 13/662 |
| 2019/0192884 A1 | 6/2019 | Cowhig et al. | | |

FOREIGN PATENT DOCUMENTS

DE 3143290 A1 5/1983
EP 1433702 A1 6/2004

* cited by examiner

PRESSURE REGULATOR FOR INFLATION SYSTEMS

FOREIGN PRIORITY

This application claims priority to European Patent Application No. 19461551.5 filed Jun. 28, 2019, the entire contents of which is incorporated herein by reference.

TECHNICAL FIELD

The present disclosure relates to a pressure regulator that may be used for example in inflation systems for evacuation slides.

BACKGROUND

Evacuation slides for aircraft and other structures are inflated using gas, for example from a high pressure source such as a pressurised gas vessel. Such systems are fitted with a pressure regulator to ensure that a sufficient inflation pressure is maintained during inflation, given that the pressure of inflating gas will fall during inflation as the pressurising gas empties from the pressurised vessel. Such regulators are typically mechanical valves, for example spool or slide valves comprising a spring loaded control element, the spring force reacting aerodynamic forces during operation to provide the necessary regulation.

While effective, such regulators may be complicated in construction, require careful calibration and therefore expensive in terms of manufacture and maintenance.

SUMMARY

From a first aspect, the disclosure provides a pressure regulator comprising a primary fluid inlet for connection to a source of high pressure fluid and a fluid outlet for connection to a space to receive the high pressure fluid. The regulator further comprises a convergent-divergent nozzle having an upstream convergent section, a throat and a downstream divergent section, the primary fluid inlet being in fluid communication with the convergent section of the nozzle. The regulator further comprises an outlet pipe having an upstream end arranged around but radially spaced from the outlet of the divergent section of the nozzle. The outlet pipe is arranged to receive fluid flow from the outlet of the divergent section of the nozzle and conduct the fluid flowing from the nozzle to the fluid outlet. The radial spacing between the upstream end of the outlet pipe and the outlet of the divergent section of the nozzle forms a secondary fluid inlet for introduction of a fluid into the outlet pipe from outside the nozzle at a location adjacent the outlet of the divergent section of the nozzle.

In any embodiment of pressure regulator in accordance with the disclosure, the outlet pipe may be a diffuser.

In any embodiment of pressure regulator in accordance with the disclosure, the outlet pipe may comprise a radially expanding section at its upstream end adjacent the nozzle.

The outlet pipe may have a constant diameter section downstream of the radially expanding section.

Any embodiment of pressure regulator in accordance with the disclosure may further comprise a flow recirculation conduit for connection at a first end to the secondary fluid inlet and at a second end to the space.

The connection of the flow recirculation conduit to the secondary fluid inlet may be upstream of the outlet of the nozzle.

In any embodiment of pressure regulator in accordance with the disclosure, the secondary fluid inlet may be an annular space.

In any embodiment of pressure regulator in accordance with the disclosure, the nozzle and outlet pipe may have the same cross-sectional shape, for example circular.

The disclosure also provides an inflation system comprising a source of high pressure fluid, a body for inflation and a pressure regulator in accordance with the disclosure, wherein the primary fluid inlet of the pressure regulator is connected to the source of high pressure fluid and the fluid outlet of the pressure regulator is connected to the body and the pressure of the source of the high pressure fluid. The configuration of the nozzle is such that when the high pressure fluid is supplied to the nozzle from the source, the nozzle will operate as an underexpanded nozzle, so as to produce supersonic flow in the outlet pipe.

Any embodiment of inflation system in accordance with the disclosure may further comprise an aspirator fluidly connected to the outlet pipe for inducing a supplementary flow of inflation fluid into the body.

In any embodiment of inflation system in accordance with the disclosure, the source of high pressure fluid is a pressurised vessel, for example a bottle or canister.

In any embodiment of inflation system in accordance with the disclosure, the body is an inflatable evacuation slide, for example for an aircraft.

The disclosure also provides a method of regulating the pressure of a fluid supplied to a space from a high pressure fluid source. The method comprises supplying fluid from the high pressure fluid source to an inlet of a convergent divergent nozzle, the pressure of the fluid source and configuration of the nozzle being such that the nozzle operates in an underexpanded condition, thereby producing a supersonic flow at an outlet of the nozzle, supplying the underexpanded flow from the outlet of the nozzle to an outlet pipe having an upstream end arranged around but radially spaced from the outlet of the nozzle, expanding the fluid flow in the outlet pipe, conducting the fluid flow from the nozzle to the fluid outlet along the outlet pipe, and introducing a secondary fluid into the outlet pipe at a location adjacent the outlet of the nozzle.

The secondary fluid may be supplied from the space.

In any embodiment, 1%-2% of the mass of fluid entering the space is recirculated to the outlet pipe.

BRIEF DESCRIPTION OF DRAWINGS

Some embodiments of the disclosure will now be described by way of example only with reference to the accompanying drawings in which.

DETAILED DESCRIPTION

Figure 1:
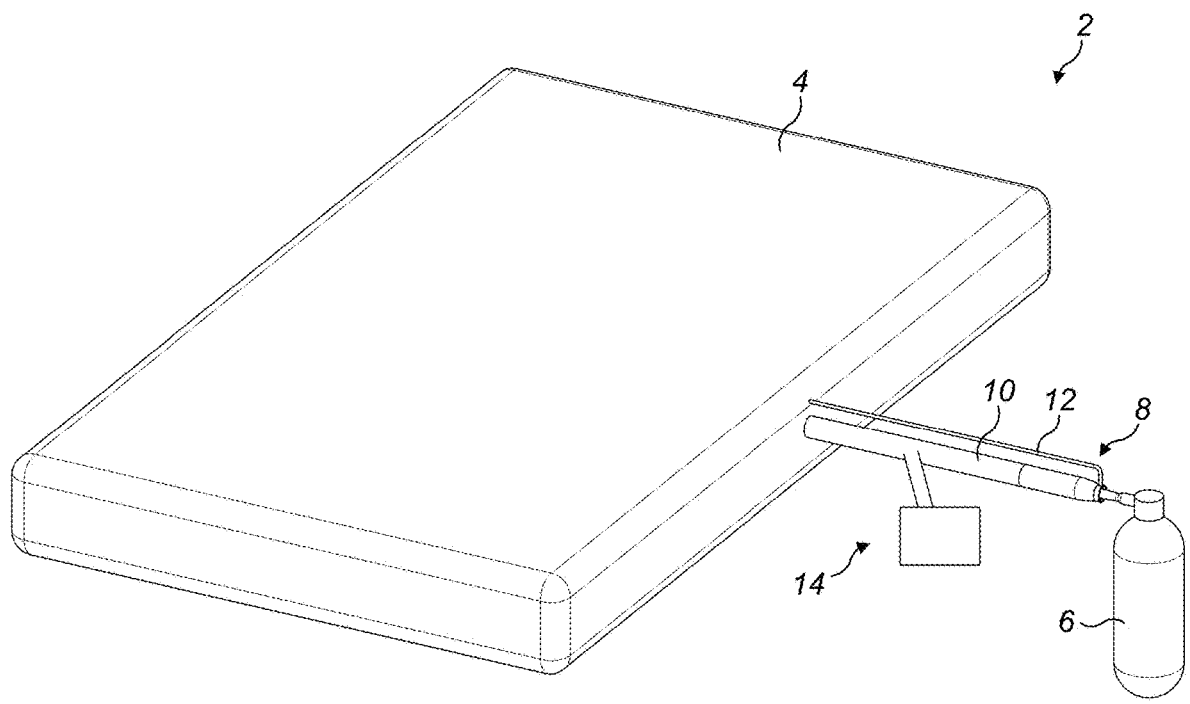
FIG. 1 shows an inflatable slide system in accordance with the disclosure.

With reference to FIG. 1, inflation system 2 comprises a body 4 to be inflated, a vessel 6 holding a high pressure fluid, a pressure regulator 8 for regulating the pressure of the fluid flowing from the vessel 6 to the body 4, a conduit 10 connecting the pressure regulator 8 to the body 4 and a fluid recirculation conduit 12 connecting the body 4 to the pressure regulator 8.

The vessel 6 holding a high pressure fluid may be provided with a release valve for releasing the high pressure fluid from the vessel in response to an actuating signal. Such relief valve mechanisms are well known in the art and need not, therefore, be described in further detail here.

The inflatable body 4 may be, for example, an inflatable evacuation slide for an aircraft, an inflatable vessel or some other inflatable device.

The conduit 10 may be provided with an aspirator 14 (illustrated schematically) for inducing an additional flow of air into the conduit 10 to assist in inflating the body 4. Such aspirators 14 are well known in the art and need not, therefore, be described in further detail here.

It is necessary to regulate the flow of high pressure fluid from the fluid source 6 to the inflatable body 4 so as to achieve inflation of the body 4 within an acceptable time period. The inflation pressure should be maintained at a sufficiently high level for as long as possible to ensure inflation of the body 4. For example, in the case of an evacuation slide the slide should be fully inflated in a period of 4 to 6 seconds.

Figure 2:
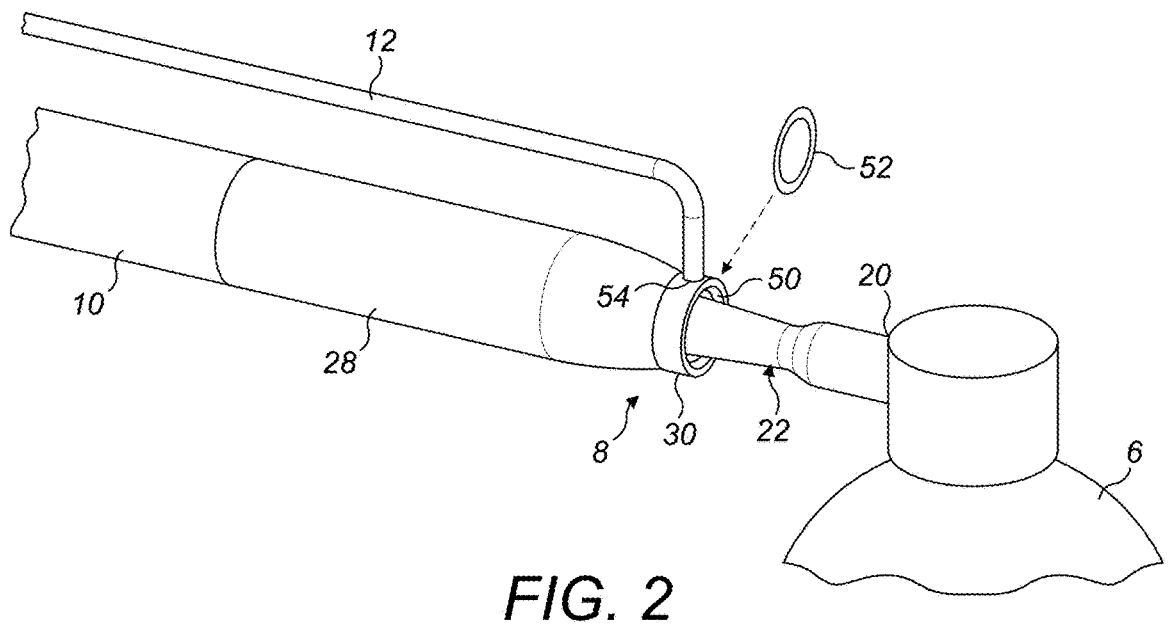
FIG. 2 shows a detail of the pressure regulator of the system of FIG. 1.
Figure 3:
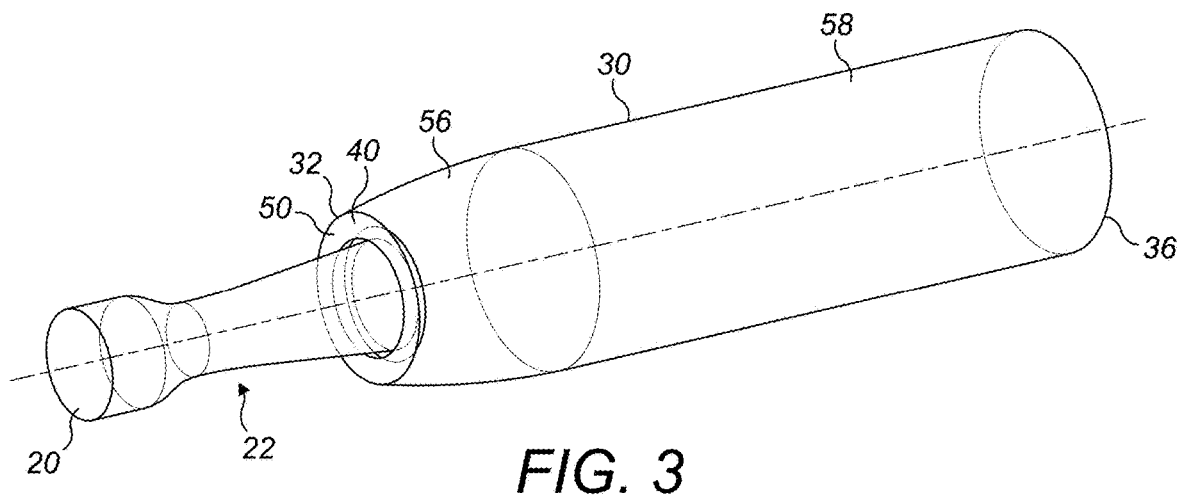
FIG. 3 shows the nozzle configuration of FIG. 2 in more detail.
Figure 4:
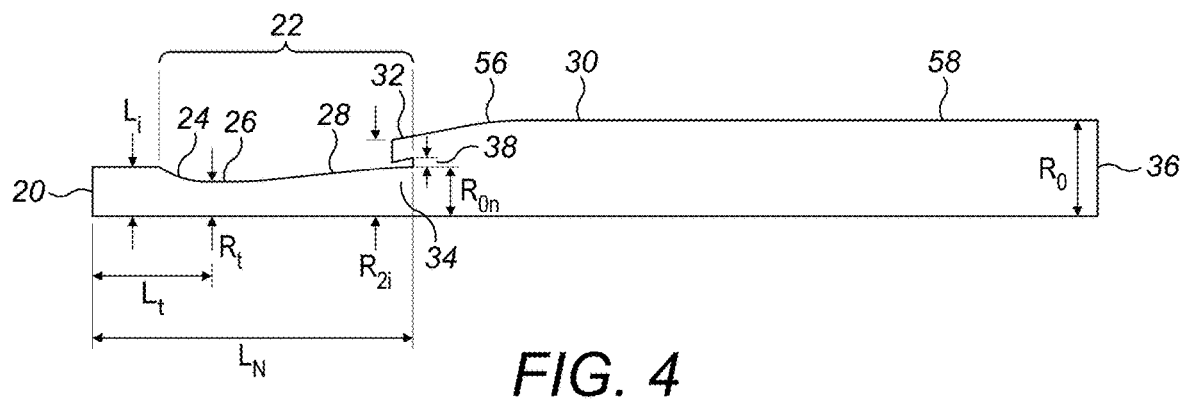
FIG. 4 shows a longitudinal cross-section through the detail of FIG. 3.

A pressure regulator 8 in accordance with the disclosure is illustrated in greater detail in FIGS. 2 to 4.

The pressure regulator 8 comprises a primary fluid inlet 20 for connection to the vessel 6. A convergent-divergent nozzle 22 is fluidly connected to the primary fluid inlet 20 for receiving pressurised fluid from the vessel 6. The nozzle 22 comprises an upstream convergent section 24, a throat 26 and a downstream divergent section 28 (see FIG. 4).

The pressure regulator 8 further comprises an outlet pipe 30. The outlet pipe 30 has an upstream end 32 arranged around but radially spaced from the outlet 34 of the divergent section 28 of the nozzle 22. The outlet pipe 30 is therefore arranged to receive fluid flow from the outlet 34 of the divergent section 28 of the nozzle 22 and conduct the fluid flowing from the nozzle 22 to a fluid outlet 36. The fluid outlet 36 may connect directly with the inflatable body 4 or, as shown to the conduit 10 which connects to the inflatable body 4.

A radial spacing 38 exists between the upstream end 32 of the outlet pipe 30 and the outlet 32 of the divergent section 28 of the nozzle 22. This forms an annular space 40 between the upstream end 32 of the outlet pipe 30 and the outlet 34 of the divergent section 28 of the nozzle 22. As will be described further below, this annular space 40 acts as a secondary fluid inlet 42 for introduction of a further fluid into the outlet pipe 30 from outside the nozzle 22 at a location adjacent the outlet 32 of the divergent section 28 of the nozzle 22 in order to influence the flow in the outlet pipe 30 downstream of the nozzle 22 and thereby influence the pressure of the fluid at the regulator fluid outlet 34. The outlet 34 is formed with a sharp edge, as shown The annular space 40 may, as illustrated schematically in FIG. 3 be open to ambient, for example having an open end 50. In other embodiments, however, the open end 50 may be closed, for example by a plate 52 illustrated schematically in FIG. 2.

The outlet pipe 30 has an upstream radially expanding section 56 at its upstream end adjacent the nozzle 22 and a constant diameter section 58 downstream of the radially expanding section 56. The outlet pipe 30 therefore acts as a diffuser. The shape of the outlet pipe 30 should be consistent with that of the nozzle 22. Thus, in the illustrated embodiment where the nozzle 22 has a circular cross section, the outlet pipe 30 is also circular in cross section. It should also be designed so that the radially expanding section smoothly increases in diameter to the constant diameter section so as to avoid sharp or rapid changes in flow which might lead, for example, to flow separation which is undesirable. The radius of the outlet pipe 30 may also be important as influences the maximum value of Mach number in the outlet flow.

The flow of fluid through a converging/diverging nozzle is well known. The flow regime is determined by the shape and dimensions of the nozzle and also the pressure ratio which exists across the nozzle. As the pressure ratio across the nozzle increases, the velocity of the fluid flow through the divergent section of the nozzle may increase to supersonic. At relatively high pressure ratios across the nozzle, the flow emanating from the outlet of the divergent section of the nozzle may be "underexpanded".

Figure 5:
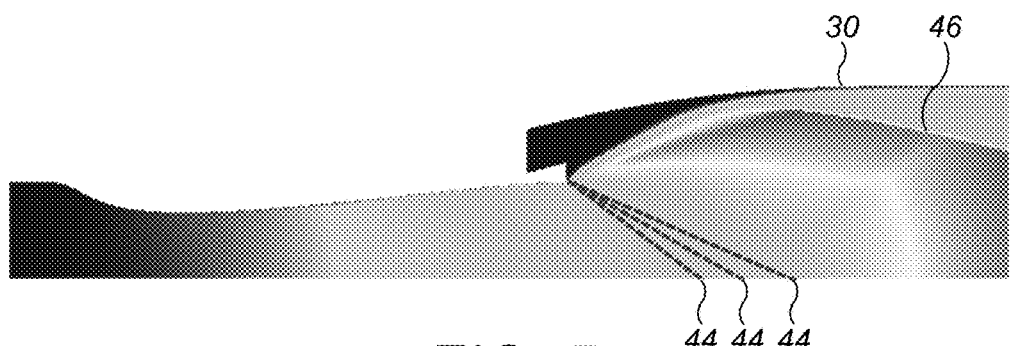
FIG. 5 illustrates a detail of fluid flow through in a pressure regulator in accordance with the disclosure.

Such a condition is illustrated in FIG. 5 which illustrates a typical flow velocity distribution in a flow regulator 2 in accordance with the disclosure.

As can be seen in FIG. 5, in an underexpanded operating condition expansion waves 44 emanate from the outlet 34 of the divergent section 28 of the nozzle 22. Shocks 46 form in the flow further along the outlet pipe 30, further away from the outlet 34 of the convergent section 28 of the nozzle 22. The effect of the shocks 46 is to reduce the total pressure of the flow through the regulator to a pressure which is compatible with the pressure required for inflation of the inflatable body 4. The particular arrangement of the shocks 46 will depend upon the shape and configuration of the nozzle 22 and also the shape and configuration of the outlet pipe 30.

In the embodiment illustrated, the nozzle 22 has an inlet radius Li of 5 mm, an outlet radius Ron also 5 mm and a throat radius of 3.42 mm, an overall length LN of 33 mm and an inlet to throat distance Lt of 13.4 mm. The outlet pipe has an inlet radius R2i of 8.92 mm and a constant section radius Ro of 10 mm. The radial spacing 38 is 1 mm. However, the dimensions of the nozzle 22 and outlet pipe 30 can be chosen to suit the particular pressure and flow rates required.

During dispensing the fluid from the high pressure vessel 6, the pressure at the fluid inlet will fall. As it does so, so will the pressure of fluid being supplied to the inflatable body 4. As discussed above, it is desirable in some embodiments to maintain the inflation pressure as high as possible for as long as possible to ensure rapid inflation of the inflatable body 4. Maintaining the outlet pressure of the regulator 6 relatively high is potentially of particular significance in systems using aspirators 14 as a certain minimum pressure is required to allow these to operate successfully.

It has been recognised that by feeding back fluid from the inflating body 4 to the secondary inlet 42 of the pressure regulator 6 that the reduction in outlet pressure can be reduced. The pressure of the secondary fluid will increase (as the inflatable body inflates) as the pressure of the supply decreases. The addition of higher pressure fluid at the secondary inlet 42 affects the strength of the shocks 46 such that the drop in pressure across the shocks 46 decreases, leading to higher outlet pressure being maintained. Thus in certain embodiments, a fluid recirculation conduit 12 is provided between the inflatable body 4 and the secondary inlet 42. The outlet 54 of the fluid recirculation conduit 12 in the secondary inlet 42 is arranged upstream of the downstream end 28 of the nozzle 22 such that supersonic fluid exiting the nozzle 22 cannot enter the conduit outlet 54 as it would have to turn through 180° to do so.

Some CFD modelled Mach number distributions and total pressure distributions for a system in accordance with the disclosure are shown in FIGS. 6 to 9.

Figure 6:
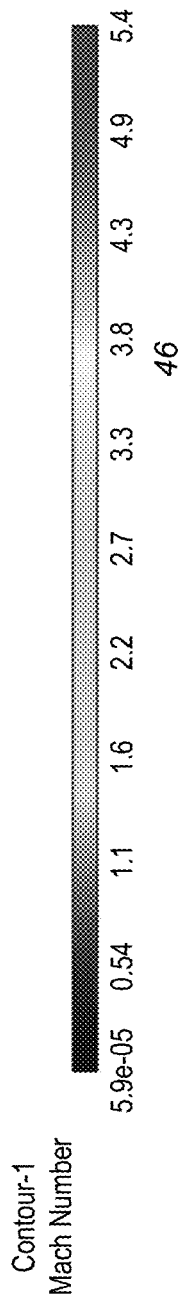
FIG. 6 illustrates Mach number distribution in a first pressure regulator in accordance with the disclosure at a first inlet pressure.
Figure 7:
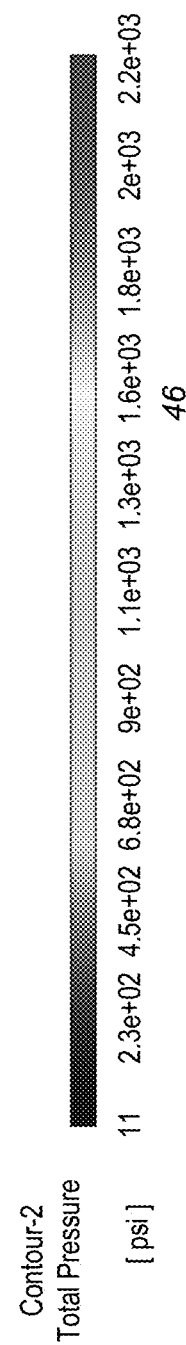
FIG. 7 illustrates the total pressure distribution corresponding to the Mach number distribution illustrated in FIG. 6.
Figure 8:
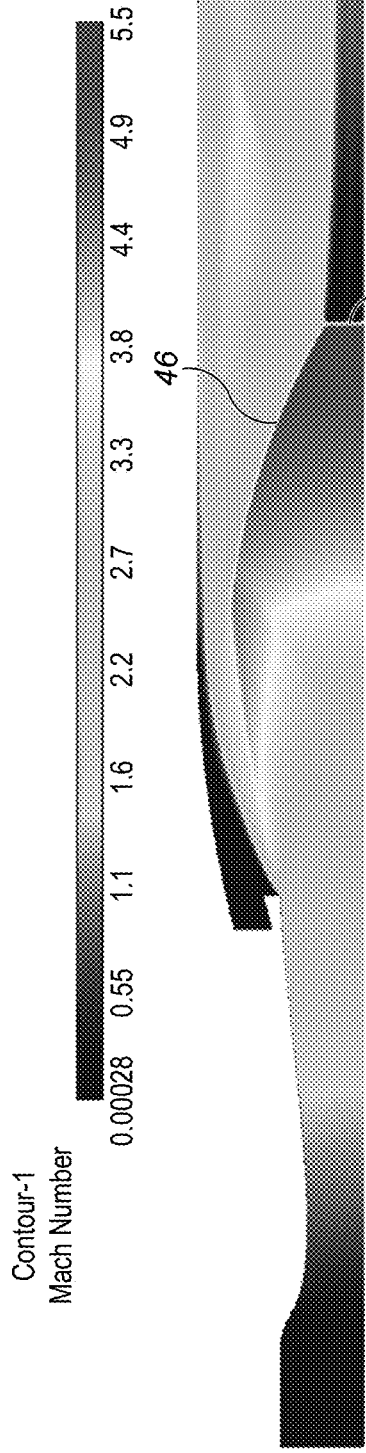
FIG. 8 illustrates Mach number distribution in the first pressure regulator at a second inlet pressure.
Figure 9:
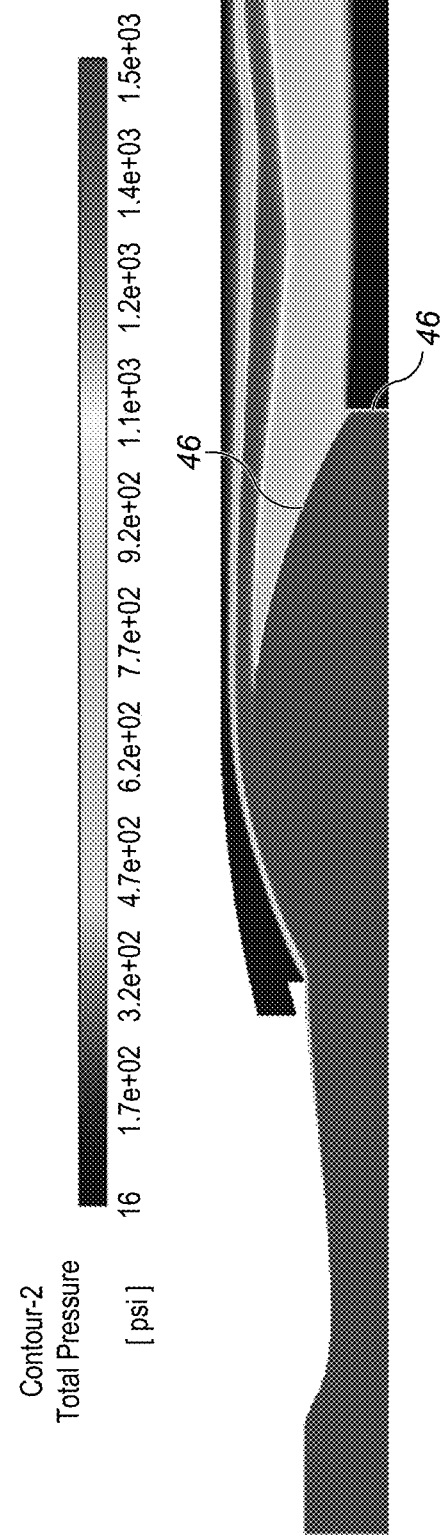
FIG. 9 illustrates the total pressure distribution corresponding to the velocity distribution illustrated in FIG. 8.

FIGS. 6 and 7 show the flow Mach number and total pressure of the fluid in a regulator as illustrated in FIG. 2, with the conduit 12 at the start of inflation. The fluid pressure at the nozzle inlet 20 is 2000 psi (13.8 MPa) and atmospheric pressure (14.7 psi (101 kPa) at the inflatable body 6 and at the secondary inlet 43. In this condition, the average total pressure over the outlet 36 is 685 psi (4.7 MPa).

FIGS. 6 and 7 show the flow Mach number and total pressure of the fluid at a later stage in inflation where the inlet pressure has fallen to 1500 psi (10.3 MPa) but the pressure within the inflatable body 6 and thus at the secondary inlet 40 has risen to 25 psi (172 kPa) conduit 12. In this condition, the average total pressure over the outlet 36 has fallen to 655 psi (4.5 MPa).

In a comparative example, with no flow recirculation conduit 12 and same initial pressure conditions, by the time the inlet pressure had fallen to 1500 psi (10.3 MPa), the average total pressure over the outlet 36 had fallen to 540 psi (3.7 MPa). The use of a recirculation conduit therefore maintains outlet pressure at a higher value than otherwise.

Although flow is recirculated from the inflatable body 4 through the recirculation conduit 12, only a small percentage of the fluid mass is recirculated, meaning that the pressure within the inflatable body will still increase.

In a typical embodiment, between 1% and 2%, for example 1.3% of the mass flow into the inflatable body 6 may be recirculated. However, in other embodiments the percentage may be different, for example between 0.5% and 5%.

While the embodiments above have been described in relation to inflation systems, the pressure regulator may be used in other applications where a relatively constant output pressure is required.

The pressure regulator of the disclosure is advantageous, inter alia, in that it has no moving parts and as such does not need maintenance to the same degree as a traditional mechanical regulator.

Also, while the nozzle 22 and outlet pipe 30 have been illustrated as circular in cross section, in other embodiments they may have a different shape for example elliptical. In that context, for non-circular shapes the term "diameter" may be taken as being a significant dimension such as a major axis length. In any event, flow similar to that obtained with a circular cross section can be achieved with consistent cross-sectional areas.

The invention claimed is:

1. A pressure regulator comprising:
a primary fluid inlet for connection to a source of high pressure fluid
a fluid outlet for connection to a space to receive the high pressure fluid;
a convergent-divergent nozzle having an upstream convergent section, a throat and a downstream divergent section, the primary fluid inlet being in fluid communication with the convergent section of the nozzle; and
an outlet pipe having an upstream end arranged around but radially spaced from the outlet of the divergent section of the nozzle, the outlet pipe arranged to receive fluid flow from the outlet of the divergent section of the nozzle and conduct the fluid flowing from the nozzle to the fluid outlet;
wherein the radial spacing between the upstream end of the outlet pipe and the outlet of the divergent section of the nozzle form a secondary fluid inlet for introduction of a fluid into the outlet pipe from outside the nozzle at a location adjacent the outlet of the divergent section of the nozzle, and the outlet pipe comprises a radially expanding section at its upstream end adjacent the nozzle, and the radially expanding section expands from a smaller to larger dimension in a downstream direction; and
a flow recirculation conduit for connection at a first end to the secondary fluid inlet and at a second end to the space.

2. A pressure regulator as claimed in claim 1, wherein the outlet pipe is a diffuser.

3. A pressure regulator as claimed in claim 1, wherein the outlet pipe has a constant diameter section downstream of the radially expanding section.

4. A pressure regulator as claimed in claim 1, wherein the connection of the flow recirculation conduit to the secondary fluid inlet is upstream of the outlet of the nozzle.

5. A pressure regulator as claimed in claim 1, wherein the secondary fluid inlet is an annular space.

6. A pressure regulator as claimed in claim 1, wherein the nozzle and outlet pipe have the same cross-sectional shape.

7. An inflation system comprising:
a source of high pressure fluid;
a body for inflation; and
a pressure regulator as claimed in claim 1;
wherein the primary fluid inlet of the pressure regulator is connected to the source of high pressure fluid and the fluid outlet of the pressure regulator is connected to the body;
wherein the pressure of the source of the high pressure fluid and the configuration of the nozzle are such that when the high pressure fluid is supplied to the nozzle from the source, the nozzle will operate as an underexpanded nozzle, so as to produce supersonic flow in the outlet pipe.

8. An inflation system as claimed in claim 7, further comprising an aspirator fluidly connected to the outlet pipe for inducing a supplementary flow of inflation fluid into the body.

9. An inflation system as claimed in claim 7, wherein the source of high pressure fluid is a pressurised vessel.

10. An inflation system as claimed in claim 7, wherein the body is an inflatable evacuation slide.

11. A method of regulating the pressure of a fluid supplied to a space from a high pressure fluid source, the method comprising:
supplying fluid from the high pressure fluid source to an inlet of a convergent divergent nozzle, the pressure of the fluid source being such that the nozzle operates in an underexpanded condition, thereby producing a supersonic flow at an outlet of the nozzle;
supplying the underexpanded flow from the outlet of the nozzle to an outlet pipe having an upstream end arranged around but radially spaced from the outlet of the nozzle and the outlet pipe comprises a radially expanding section at its upstream end adjacent the nozzle, and the radially expanding section expands from a smaller to larger dimension in a downstream direction;

expanding the fluid flow in the outlet pipe and conducting the fluid flow from the nozzle to the fluid outlet along the outlet pipe; and introducing a secondary fluid supplied from the space into the outlet pipe at a location adjacent the outlet of the nozzle.

12. A method as claimed in claim 11, wherein 1%-2% of the mass of fluid entering the space is recirculated to the outlet pipe.

13. An inflation system as claimed in claim 7, wherein the source of high pressure fluid is a bottle or canister.

14. An inflation system as claimed in claim 7, wherein the body is an evacuation slide for an aircraft.

\* \* \* \* \*